United States Patent
Hirschmann et al.

(10) Patent No.: US 6,915,891 B2
(45) Date of Patent: Jul. 12, 2005

(54) PRESSURE PLATE ASSEMBLY FOR A FRICTION CLUTCH

(75) Inventors: Frank Hirschmann, Niederwerrn (DE); Reinhold Weidinger, Unterspiesheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/668,784

(22) Filed: Sep. 22, 2003

(65) Prior Publication Data

US 2004/0055847 A1 Mar. 25, 2004

(30) Foreign Application Priority Data

Sep. 24, 2002 (DE) ......................................... 102 44 487

(51) Int. Cl.[7] .............................................. F16D 13/75
(52) U.S. Cl. ................................. 192/111 R; 192/70.25
(58) Field of Search ........................... 192/70.25, 111 R

(56) References Cited

U.S. PATENT DOCUMENTS

| 1,016,427 A | * | 2/1912 | Morse ...................... 192/70.12 |
| 1,571,015 A | * | 1/1926 | Leighton .................. 192/70.25 |
| 4,953,680 A | * | 9/1990 | Flotow et al. ........... 192/111 B |
| 5,526,913 A | * | 6/1996 | Tarlton et al. ........... 192/70.25 |
| 6,186,302 B1 | * | 2/2001 | Drexl et al. ............. 192/70.25 |

* cited by examiner

Primary Examiner—Richard M. Lorence
(74) Attorney, Agent, or Firm—Cohen, Pontani, Lieberman & Pavane

(57) ABSTRACT

A pressure plate, which is connected to a housing arrangement for rotation in common around an axis of rotation, and a force-exerting arrangement preferably a force-storing device, is supported against the housing arrangement and the pressure plate so that it can exert force on them. At least one wear take-up element of a wear take-up device is provided in the path of support between the force-exerting arrangement and the pressure plate. The wear take-up element has a manually operated adjusting element, which is movably supported on the pressure plate and engages with the at least one wear take-up element so that this element can be shifted with respect to the assembly to compensate for the wear which has occurred.

17 Claims, 1 Drawing Sheet

PRESSURE PLATE ASSEMBLY FOR A FRICTION CLUTCH

BACKGROUND OF THE INVENTION

1. Field of the Invention

The present invention pertains to a pressure plate assembly for a friction clutch, comprising a housing arrangement; a pressure plate, which is connected to the housing arrangement for rotation in common around an axis of rotation; and a force-exerting arrangement, preferably a force-storing device, which is supported against the housing arrangement and the pressure plate so that it can exert force on them.

2. Description of the Related Art

When these types of pressure plate assemblies are used in friction clutches, the occurrence of wear in the area of the friction linings of a clutch disk leads on principle to the problem that the pressure plate shifts position relative to the housing arrangement as a function of the amount of wear, and thus the force-exerting arrangement also changes its installation position. When a diaphragm spring is used as the force-storing device, this shift in position causes the actuating forces to change also. When this type of clutch arrangement is used in conjunction with an unsynchronized gearbox, there is the problem that, because of the change in the installation position of the force-storing device or of the force-exerting arrangement, the actuating mechanism also changes its position and to this extent the correct and reliable actuation of a gearbox brake during the performance of clutch-release processes is no longer assured.

To deal with this problem, it is known that automatic wear take-up systems can be provided in these types of pressure plate assemblies, but they are relatively complicated in design and therefore expensive. It is also known that opportunities for manual compensation can be provided on the actuating mechanism itself to keep the actuating position of this mechanism essentially constant despite changes in the installation position of the force-exerting arrangement caused by wear. These types of compensating systems, however, are usually difficult to reach and are frequently subject to severe corrosion, which makes them very difficult to actuate.

SUMMARY OF THE INVENTION

The object of the present invention is to provide a pressure plate assembly for a friction clutch in which wear-compensating processes can be carried out in a simple and reliable manner.

This object is achieved according to the invention by a pressure plate assembly for a friction clutch comprising a housing arrangement; a pressure plate, which is connected to the housing arrangement for rotation in common around an axis of rotation; and a force-exerting arrangement, preferably a force-storing device, which is supported against the housing arrangement and the pressure plate so that it can exert force on them. At least one wear take-up element of a wear take-up device is located in the path of support between the force-exerting arrangement and one of the two assemblies in question, i.e., the housing arrangement or the pressure plate. The wear take-up element works together with a manually operated adjusting element, which is mounted movably on the assembly in question and which engages with the minimum of one wear take-up element so that this element can be shifted with respect to the assembly to compensate for the wear which has occurred.

In the present invention, therefore, the wear take-up process takes place within the pressure plate assembly itself, that is, in an area which is essentially protected from the outside by various system components and thus is subject to essentially no corrosion. The adjusting force is transmitted to the minimum of one wear take-up element by an adjusting element, which can be actuated from the outside, so that ease of access can also be ensured.

So that the interaction between the adjusting element and the minimum of one wear take-up element can be achieved in a simple and reliable manner, it is proposed that the adjusting element be supported rotatably on one of the two assemblies and that it have a toothed section, which meshes with a toothed area on the wear take-up element. It is possible in this case for the adjusting element to be supported rotatably on one of the assemblies by a bed bolt.

When the friction clutch is engaged, comparatively powerful forces are being transmitted by the force-exerting arrangement to the pressure plate. Because these forces must be supported by the minimum of one wear take-up element, it is important to ensure that these forces or possibly other types of vibrational forces cannot cause any undesirable displacement of the wear-adjusting element. It is therefore proposed that an arresting device be provided to prevent the adjusting element from executing adjusting movements. The arrest of the adjusting element also has the effect of preventing the wear take-up element from moving. So that the adjusting element can be adjusted easily, it is proposed that the bed bolt be a screw bolt, which is screwed into one of the two assemblies and which can be rotated with respect to the assembly in order to arrest or to release the adjusting element.

In an embodiment which is very easy to realize and which also, because of its symmetry, essentially avoids the introduction of any imbalances, the minimum of one wear take-up element can be designed as an adjusting ring, which has a toothed section in a certain circumferential area, with which the toothed area of the adjusting element meshes. To minimize the total amount of space required by the wear take-up device in a design of this type, it is proposed that the adjusting element be located radially inside the adjusting ring.

An improvement in the reliability with which the force-exerting arrangement can be kept in its original position can be achieved by locating the wear take-up element in the path of support between the pressure plate and the force-exerting arrangement.

So that the adjusting element can be manipulated from the outside, it is also possible to provide the adjusting element with an actuating area formed in such a way that a tool can get a good grip on it. Especially when the minimum of one wear take-up element is located between the pressure plate and the force-exerting arrangement, it is advantageous as a way of facilitating access to the adjusting element for the actuating area to extend through the force-exerting arrangement so that the actuating tool can grip it. Also to facilitate access to the adjusting element, furthermore, an opening can be provided in the housing arrangement to provide access to the formation which the tool will grip.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
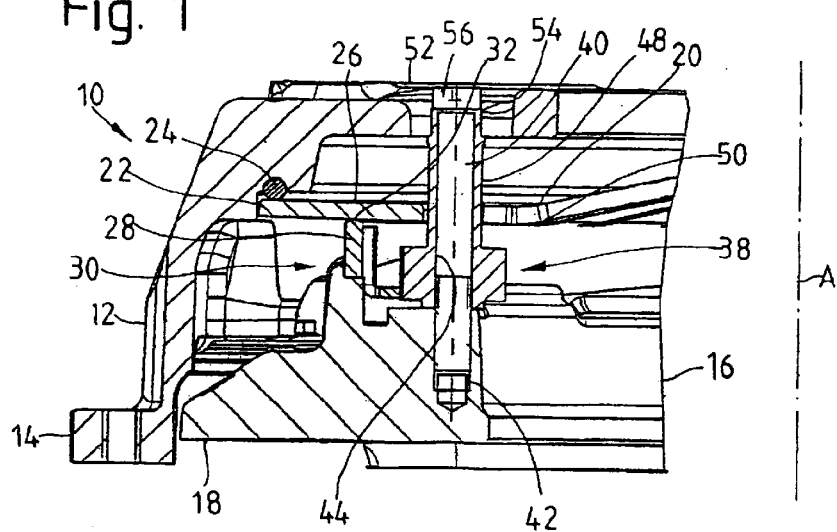
FIG. 1 shows a longitudinal cross section through a radially outer area of a pressure plate assembly according to the invention, taken along line I—I of the components shown in FIG. 2.

FIG. 1 shows a pressure plate assembly 10 according to the invention. The pressure plate assembly 10 comprises a housing 12, the radially outer flange-like area 14 of which can be connected permanently to a flywheel for rotation in common around an axis of rotation A. In the housing 12, a pressure plate 16 is provided, which is connected to the housing 12 by means of, for example, tangential leaf springs or some other type of connecting elements so that it cannot rotate relative to the housing but can move in the direction parallel to that of the axis of rotation A. The pressure plate 16 makes available a friction surface 18, by which it can act on the area of the clutch disk which carries the friction linings. In the example shown here of a clutch of the pull type, the radially outer area 22 of a force-storing unit 20 is supported on the housing 12 by a wire ring 24 or the like, whereas the area 26 situated farther inward in the radial direction acts on the pressure plate 18 by way of a wear take-up ring 28 of a wear take-up device 30. A clutch-release mechanism (not shown) is able to act on the radially innermost area of the force-exerting device 20.

On the side supported against the pressure plate 16, the wear take-up ring 28 has a plurality of ramp-like areas extending in the circumferential direction. The pressure plate 16 has complementary ramp areas, so that the rotation of the wear take-up ring 28 in the circumferential direction has the effect of changing the axial position of the area 32 of the ring upon which the force-storage device 20 acts and thus of changing the overall axial dimension extending between this area 32 and the friction surface 18 of the pressure plate 16.

On its inner circumferential surface, the wear take-up ring 28 has a segment-like toothed section 34 extending in the circumferential direction. This area can be formed on a separate toothed element 36, which projects radially toward the inside. This toothed element 36 can be welded or attached permanently by some other suitable method to the wear take-up ring 28. Of course, the toothed area 34 could also constitute an integral part of the wear take-up ring 28.

Figure 2:
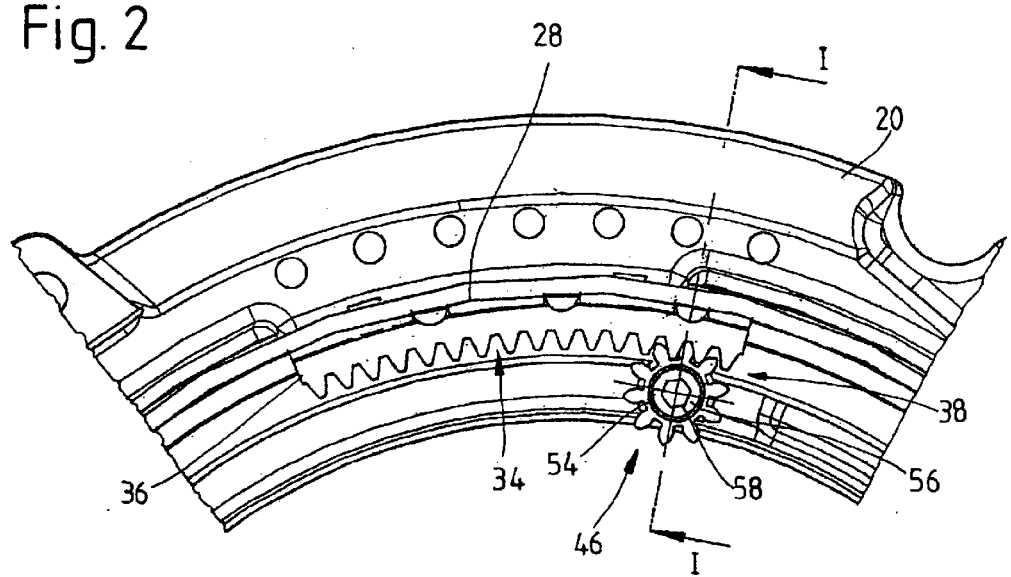
FIG. 2 shows an axial view of the part of the pressure plate where the wear take-up device of the pressure plate assembly shown in FIG. 1 is located.

An adjusting element 38 is rotatably supported on the pressure plate 16. For this purpose, bolt 40 is screwed into an internally threaded hole 42 in the pressure plate 16. The bolt 40 extends through a central opening 44 in the adjusting element 38. In the part near the pressure plate 16, the adjusting element 38 has a toothed section 46, formed essentially by a gear wheel, which acts as a pinion. This toothed section 46 meshes with the toothed section 34 on the wear take-up ring 28, which acts as a rack, so that the rotation of the adjusting element 38 leads via the meshing between the two toothed sections 34, 46, to a rotation of the wear take-up ring 28. A shaft-like actuating area 48 of the adjusting element 38 extends away from the toothed section 46 and passes through an opening 50 in the force-storing device 20 provided for this purpose. This shaft-like actuating area 48 extends all the way to an opening 52 formed in the housing 12. At its axial end, the actuating area 48 has a tool grip formation 54, formed by, for example, an external hexagon. The bolt 40 also extends through this shaft-like actuating area 48, and its head 56 ensures that the entire adjusting element 38 is held axially between the pressure plate 16 and this head 56, and thus essentially cannot move axially with respect to the pressure plate 16. To make it possible for a socket wrench, etc., to gain access to the tool grip formation 54, for example, the outside dimension of the head 56 of the screw bolt is preferably smaller than that of the tool grip formation 54. So that the screw bolt 40 can be turned relative to the pressure plate 16, a hexagon socket 58 can be provided in its head 56, as shown in FIG. 2 by way of example. By rotating the bolt 40 relative to the pressure plate 16, the threaded engagement between these two components means that the axial position of the head 56 will change relative to the pressure plate 16. Depending on the direction in which the bolt 40 is turned, therefore, the adjusting element 38 will be either clamped against the pressure plate 16 or released from the clamped state. Clamping or arresting the adjusting element 38 relative to the pressure plate 16 simultaneously ensures that the toothed section 46 cannot rotate, which means in turn that the toothed section 34 which meshes with this toothed section 46 cannot move either. The entire wear take-up ring 28 is thus immobilized The bolt 40 essentially therefore not only fulfills its own function as a support element for the adjusting element 38 but also serves as an arresting device for this adjusting element 38 and for the entire wear take-up device 30. Because the head 56 of the bolt 40 projects beyond the axially free end of the actuating area 48 of the adjusting element 38, this head is also freely accessible in the area of the opening 52 in the housing 12 for actuation. Both the manipulations required for arresting and those for actuating the adjusting element 38, which are accomplished by the use of appropriate tools, can be performed easily through the opening 52 and therefore from outside the housing 12. It should be pointed out here that it is not necessary for the shaft-like actuating area 48 to project as far into the opening 52 as shown here. This means, for example, that the head 56 and thus obviously also the tool grip formation 54 can be completely inside the housing or can at least be set back somewhat farther into the housing.

As a result of the design of the pressure plate assembly 10 according to the invention, i.e., of the wear take-up device 30 of that assembly, manual take-up adjustments can be easily made when the wear which has occurred in the area of the friction linings or other wearing parts makes such adjustment necessary. The wear take-up device is very simple in design and comprises essentially only two components to implement the adjusting process. The first is gripped by a tool, while the second is moved by the tool-actuated first component to accomplish the adjustment.

So that, in the arrangement according to the invention, the wear take-up adjustment can be performed as easily as possible, this manual process is usually carried out after the clutch has been disengaged, that is, in a state in which the powerful forces exerted by the force-storing device have been essentially released. The degree to which a wear take-up adjustment is then performed can be determined in various ways. For example, it is possible to compare the current position of the clutch-release bearing or of the diaphragm spring tongues with the original position present when the clutch was new and to perform the adjustment in such a way that the component in question is returned to that same position. It is also possible to determine the axial distance between the bottom of the housing and the rear surface of the force-storing device facing this bottom and then to adjust the wear take-up device until this distance is again the same as it was when the clutch was new. So that the distance can be measured accurately, it is important for the reference point on the force-storing device used to measure the distance to be sufficiently far away from the point where the device is supported against the housing. Because of the lever-like relationships governing the movement of the device, the extent of the deflections increases with the distance from the support point, and large deflections are advantageous in terms of measurement accuracy.

It should be pointed out that variations are possible, especially in the area of the wear take-up device 30. For example, the toothed section 46 could consist merely of separate segments. The wear take-up ring 28, furthermore, does not necessarily have to be supported directly against the pressure plate 16 or against the force-storage device 20. An additional intermediate ring, which cannot shift in the circumferential direction, could be provided here, for example. It would also be possible to replace the ring-shaped wear take-up element with, for example, a wedge-shaped slider, which can be shifted either in the circumferential direction or in the radial direction to implement the wear take-up process, and which can carry the corresponding toothed formations which interact with the one or more adjusting elements 38. Nor is it mandatory for the adjusting element 38 to interact with the wear take-up element by the meshing of teeth. If sufficient pressure can be applied, a friction-locking connection could also ensure the transmission of the adjusting force. It is also possible in principle to allow the elements serving to compensate for wear, that is, for example, the wear take-up ring 28 of the embodiment illustrated here, to exert the desired effects between the housing 12 and the force-storing device 20, so that, when wear occurs, the force-storing device 20 is shifted axially together with the pressure plate 16. This ensures that the force-storing device 20 always remains in its original installation position with respect to the pretension it is under, but it also means that the device and the pressure plate shift their positions together as a unit, which to this extent requires that certain measures be taken to adapt the actuating mechanism. In an embodiment of this type, the adjusting element 38 would again have to be installed rotatably on the housing 12 by means of, for example, a screw bolt or the like. It is also obvious that the force exerted on the pressure plate 16 does not necessarily have to be exerted by a force-storing device. It could be exerted instead, for example, by means of lever elements, which are supported appropriately against the housing 12 and the pressure plate 16 and which can thus transmit the required clutch-engaging forces, which are now provided by an appropriate actuating mechanism.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch, said assembly comprising:

a housing having an axis of rotation;

a pressure plate connected to said housing for rotation in common about said axis;

a force exerting arrangement supported against said housing and said pressure plate along a path of support so that it can urge said pressure plate away from said housing; and a wear take-up device comprising a wear take-up element in the path of support between the force exerting arrangement and one of said housing and said pressure plate, a carrier bolt fixed to said one of said housing and said pressure plate, and a manually operable adjusting element rotatably supported on said carrier bolt, said manually operated adjusting element engaging said at least one wear take-up element so that said wear take-up element can be shifted with respect to said one of said housing and said pressure plate to compensate for wear of said friction clutch, wherein said carrier bolt is screwed in said one of said housing and said pressure plate and can be rotated with respect to said one of said housing and said pressure plate in order to arrest movement of said adjusting element with respect to said one of said housing and said pressure plate.

2. A pressure plate assembly as in claim 1 wherein said wear take-up element has a toothed area and said adjusting element is rotatably supported on said one of said housing and said pressure plate and has a toothed area which engages said toothed area of said take-up element.

3. A pressure plate assembly as in claim 1 further comprising an arresting device for arresting movement of said adjusting element with respect to said one of said housing and said pressure plate.

4. A pressure plate assembly as in claim 2 wherein said wear take-up element comprises a circumferential area having a toothed area which engages said toothed area of said adjusting element.

5. A pressure plate assembly as in claim 4 wherein said adjusting element is located radially inside of said circumferential area of said take-up element.

6. A pressure plate assembly as in claim 1 wherein said wear take-up element is located in the path of support between the pressure plate and the force-exerting arrangement.

7. A pressure plate assembly as in claim 1 wherein said adjusting element has an actuating area with a formation which can be engaged by a tool.

8. A pressure plate assembly as in claim 7 wherein said adjusting element is supported by said pressure plate, said actuating area extending through said force-exerting arrangement so that said formation can be accessed by said tool.

9. A pressure plate assembly as in claim 8 wherein said housing has an opening arranged so that said formation can be accessed by said tool.

10. A pressure plate assembly for a friction clutch, said assembly comprising:

a housing having an axis of rotation;

a pressure plate connected to said housing for rotation in common about said axis;

a force exerting arrangement supported against said housing and said pressure plate along a path of support so that it can urge said pressure plate away from said housing; and a wear take-up device comprising a wear take-up element in the path of support between the force exerting arrangement and said pressure plate, and a manually operable adjusting element movably supported on said pressure plate, said manually operated adjusting element engaging said at least one wear take-up element so that said wear take-up element can be shifted with respect to said pressure plate to compensate for wear of said friction clutch, wherein said adjusting element has an actuating area with a formation which can be engaged by a tool, said actuating area extending through said force-exerting arrangement so that said formation can be accessed by said tool.

11. A pressure plate assembly as in claim 10 wherein said wear take-up element has a toothed area and said adjusting element is rotatably supported on said pressure plate and has a toothed area which engages said toothed area of said take-up element.

12. A pressure plate assembly as in claim 10 further comprising a carrier bolt fixed to said pressure plate, said adjusting element being rotatably supported on said carrier bolt.

13. A pressure plate assembly as in claim 10 further comprising an arresting device for arresting movement of said adjusting element with respect to said pressure plate.

14. A pressure plate assembly as in claim 12 wherein said carrier bolt is screwed in said pressure plate and can be rotated with respect to said pressure plate in order to arrest movement of said adjusting element with respect to said pressure plate.

15. A pressure plate assembly as in claim 11 wherein said wear take-up element comprises a circumferential area having a toothed area which engages said toothed area of said adjusting element.

16. A pressure plate assembly as in claim 15 wherein said adjusting element is located radially inside of said circumferential area of said take-up element.

17. A pressure plate assembly as in claim 10 wherein said housing has an opening arranged so that said formation can be accessed by said tool.

* * * * *